US005703783A

United States Patent [19]

Allen et al.

[11] Patent Number: 5,703,783

[45] Date of Patent: Dec. 30, 1997

[54] APPARATUS FOR INTERCEPTING AND FORWARDING INCORRECTLY ADDRESSED POSTAL MAIL

[75] Inventors: Ronald L. Allen, Grand Prairie; Brenda J. Bishop-Jones; Michael J. Cykana, both of Arlington; Eddie K. Lui, Euless; Stanley Wayne Sipe, Arlington, all of Tex.

[73] Assignee: ElectroCom Automation, L.P., Arlington, Tex.

[21] Appl. No.: 483,719

[22] Filed: Jun. 7, 1995

Related U.S. Application Data

[63] Continuation of Ser. No. 864,437, Apr. 6, 1992, Pat. No. 5,422,821.

[51] Int. Cl.$^6$ .......... G06F 17/60

[52] U.S. Cl. .......... 364/478.01; 364/478.14; 209/584

[58] Field of Search .......... 364/478, 401, 364/364.03, 364.02; 209/584, 900; 382/10, 11, 101, 102; 370/392; 380/23

[56] References Cited

U.S. PATENT DOCUMENTS

| | | | |
|---|---|---|---|
| 4,578,759 | 3/1986 | Horii | 364/478 |
| 4,641,753 | 2/1987 | Tamada | 209/546 |
| 4,873,645 | 10/1989 | Hunter | 364/464.02 |
| 4,979,605 | 12/1990 | Svyatsky | 198/349 |
| 4,992,649 | 2/1991 | Mampe et al. | 235/462 |
| 5,005,124 | 4/1991 | Connell et al. | 364/401 |
| 5,031,223 | 7/1991 | Rosenbaum et al. | 364/478 |
| 5,043,908 | 8/1991 | Manduley et al. | 364/478 |
| 5,050,078 | 9/1991 | Sansone | 364/406 |
| 5,058,030 | 10/1991 | Schumacher | 364/478 |
| 5,142,482 | 8/1992 | Sansone | 364/478 |
| 5,146,403 | 9/1992 | Goodman | 364/401 |
| 5,422,821 | 6/1995 | Allen et al. | 364/478 |

*Primary Examiner*—Paul P. Gordon
*Assistant Examiner*—Marc A. Wsol
*Attorney, Agent, or Firm*—Harold E. Meier

[57] ABSTRACT

The present invention comprises apparatus for identifying, intercepting and forwarding incorrectly addressed mailpieces having either a machine readable or non-machine readable address. The apparatus reads (either mechanically or manually) the addressee name and the mailpiece destination marking address for processing in a database and comparison to a list of names and former addresses in the USPS National Change of Address database of persons who have requested mail forwarding service. If the read name and address match a name and former address in the database, then the mailpiece is identified as having an incorrect address and intercepted from the mail stream. The apparatus then searches the NCOA database for a forwarding address and delivery point ZIP code corresponding to the address. The forwarding address and delivery point ZIP marking number are printed on the mailpiece in place of the incorrect address and the mailpiece is returned to the mail stream for delivery to the addressee.

5 Claims, 10 Drawing Sheets

APPARATUS FOR INTERCEPTING AND FORWARDING INCORRECTLY ADDRESSED POSTAL MAIL

This application is a continuation of application Ser. No. 07/864,437, filed Apr. 6, 1992 now U.S. Pat. No. 5,422,821.

TECHNICAL FIELD

The present invention relates to the automated and semi-automated processing of postal mailpieces and, in particular, to the identification, interception and forwarding of incorrectly addressed mailpieces from the mail stream by first identifying a mailpiece as a candidate for forwarding by comparing the name of the addressee and the destination address read from a mailpiece to a list of names and former addresses of persons who have requested mail forwarding and then forwarding the mailpiece to a forwarding address designated by the addressee.

BACKGROUND OF THE INVENTION

According to current United States Postal Service (USPS) procedures, the local post office (destination delivery unit) is responsible for identifying those mailpieces that are incorrectly addressed and require forwarding. The mail carrier typically recognizes the address on the mailpiece as no longer valid (incorrect) during the "casing" operation at the post office or during an attempted delivery of the mailpiece to the designated destination address. Most often the identification of incorrectly addressed mailpieces will only occur if the addressee completes and submits a Change of Address Order Form that requests mailpiece forwarding. A mailpiece identified as in need of forwarding is manually segregated by the carrier from correctly addressed mailpieces and removed from the mail stream to a USPS Computerized Forwarding System (CFS) for address correction.

The CFS currently utilized by the USPS is a semi-automated, computerized machine that transports the incorrectly addressed mailpieces past a human operator at a very slow rate. The operator reads each mailpiece and enters into a processing computer an extract of the name of the addressee and invalid destination address on the mailpiece. The computer searches a National Change of Address (NCOA) database maintained by the USPS according to the input invalid destination address and displays for the operator a menu of one or more possible choices of names for persons at that address who have filed a mail forwarding request. If there is a match between the name and address on the mailpiece and a name and address in the menu, the operator will select the match to signal the computer and the mailpiece will be tagged for forwarding and manually or mechanically labeled with a forwarding address. A POSTNET (bar/half-bar) destination bar code for the forwarding address is also printed and the mailpiece is returned to the mail stream for normal processing and delivery to the addressee.

A simple example of the flow of an incorrectly addressed mailpiece from an addressor in Dallas to an incorrect address in Boston and then to the correct forwarding address in Los Angeles will illustrate the inherent economic and time concern drawbacks associated with the current USPS mail forwarding system. In Dallas, the mailpiece is deposited in the mail stream by the addressor and processed by the USPS automated postal equipment at a General Mail Facility (GMF) where a destination (POSTNET) bar code corresponding to the destination address in Boston is printed on the mailpiece. The mailpiece is then collected with other similarly coded mailpieces and delivered to Boston where the address on the mailpiece will be checked for the first time for validity. If the mailpiece is found to be incorrectly addressed, the mailpiece is removed from the mail stream and sent to the nearest CFS site to be labeled with the forwarding address designated by the addressee in Los Angeles. A destination (POSTNET) bar code for the forwarding address is then printed and the mailpiece is returned to the mail stream to be transported across the country to Los Angeles for delivery to the forwarding address.

The current mail forwarding system makes inefficient use of limited USPS resources by unnecessarily transporting incorrectly addressed mailpieces to the local post office for the incorrect address before identification, address correction and forwarding occur. Accordingly, there is a need for an apparatus that will identify incorrectly addressed mailpieces prior to the time they are delivered to the local post office for the mailpiece destination address. Furthermore, there is a need for an apparatus that will obtain the forwarding address for the addressee from the incorrect address and then properly label the mailpiece for forwarding.

SUMMARY OF THE INVENTION

The present invention provides an apparatus that will identify, intercept and forward incorrectly addressed mailpieces. In accordance with the broader aspects of the invention, the apparatus functions in either an automated or semi-automated fashion to identify incorrectly addressed mailpieces by reading (either mechanically or manually) the name of the addressee and the destination address on the mailpiece. The read name and address are then compared to a list of names and former addresses of persons who have filed forwarding address information with their local post office. If the read name and address match a name and former address on the list, then the mailpiece is identified as having an incorrect address and is intercepted from the mail stream for further processing. A forwarding address for the addressee is then retrieved along with a corresponding destination (POSTNET) bar code and applied to the mailpiece in place of the incorrect address.

The forwarding mail identification (FMI) and automated mail forwarding (AMF) systems of the present invention may be efficiently incorporated into current USPS automated mail processing equipment. For machine readable mailpieces, an image of the address side of a mailpiece is captured, digitized and processed by an optical character recognition system to decode the name of the addressee and the destination address. The destination address is processed in the USPS ZIP+4 database to obtain a delivery point ZIP code. The ZIP code and/or destination address comprise delivery point information for the mailpiece. To identify the need to forward the mailpiece, the delivery point information and addressee name are processed in an addressee-former address extract of the USPS National Change of Address (NCOA) database for comparison to persons at the delivery point who have requested forwarding of mail. If there is a match between names and addresses, the mailpiece is intercepted from the mail stream with the forwarding address for the addressee retrieved from the NCOA database and applied to the mailpiece in place of the incorrect destination address. A destination (POSTNET) bar code corresponding to the delivery point ZIP code for the forwarding address is also printed on the mailpiece to assist in the automated sorting and delivery of the mailpiece to the addressee.

For non-machine readable mailpieces, an image of the address side of a mailpiece is captured, digitized and stored at an address in memory, linked therein to a unique mailpiece identification number. This digitized image is then displayed for a human operator who enters sufficient destination address information to obtain a delivery point ZIP code from the USPS ZIP+4 database. To identify the need to forward the mailpiece, the delivery point information is processed in an addressee-former address extract of the USPS National Change of Address (NCOA) database. If the operator identifies that the addressee name and address on the mailpiece matches an addressee name and former address at the delivery point, the mailpiece is intercepted from the mail stream. The forwarding address for the addressee is then retrieved by the operator from the NCOA database and applied to the mailpiece in place of the incorrect destination address. A destination (POSTNET) bar code corresponding to the delivery point ZIP code for the forwarding address is also printed on the mailpiece to assist in the automated sorting and delivery of the mailpiece to the addressee.

With integration of the FMI and AMF systems of the present invention into the existing automated USPS mail processing equipment, complete system replacement to effectuate the FMI and AMF systems of the present invention is unnecessary. Furthermore, placement of the identification and forwarding equipment within the USPS automated mail processing equipment allows for substantial savings of time and money by enabling the identification, interception and forwarding of incorrectly addressed mailpieces to occur at the time of mailpiece deposit rather than at the time of mailpiece delivery. The FMI and AMF equipment of the present may further be utilized in non-postal applications, for example, in a merchandise warehouse, to identify incorrectly labeled items prior to shipment or delivery to the customer. Other potential applications will be obvious to those skilled in the art.

BRIEF DESCRIPTION OF THE DRAWINGS

A more complete understanding of the forwarding mail identification (FMI) and automated mail forwarding (AMF) systems of the present invention may be had by reference to the following Detailed Description in conjunction with the accompanying Drawings wherein.

DETAILED DESCRIPTION OF THE DRAWINGS

Figure 1:
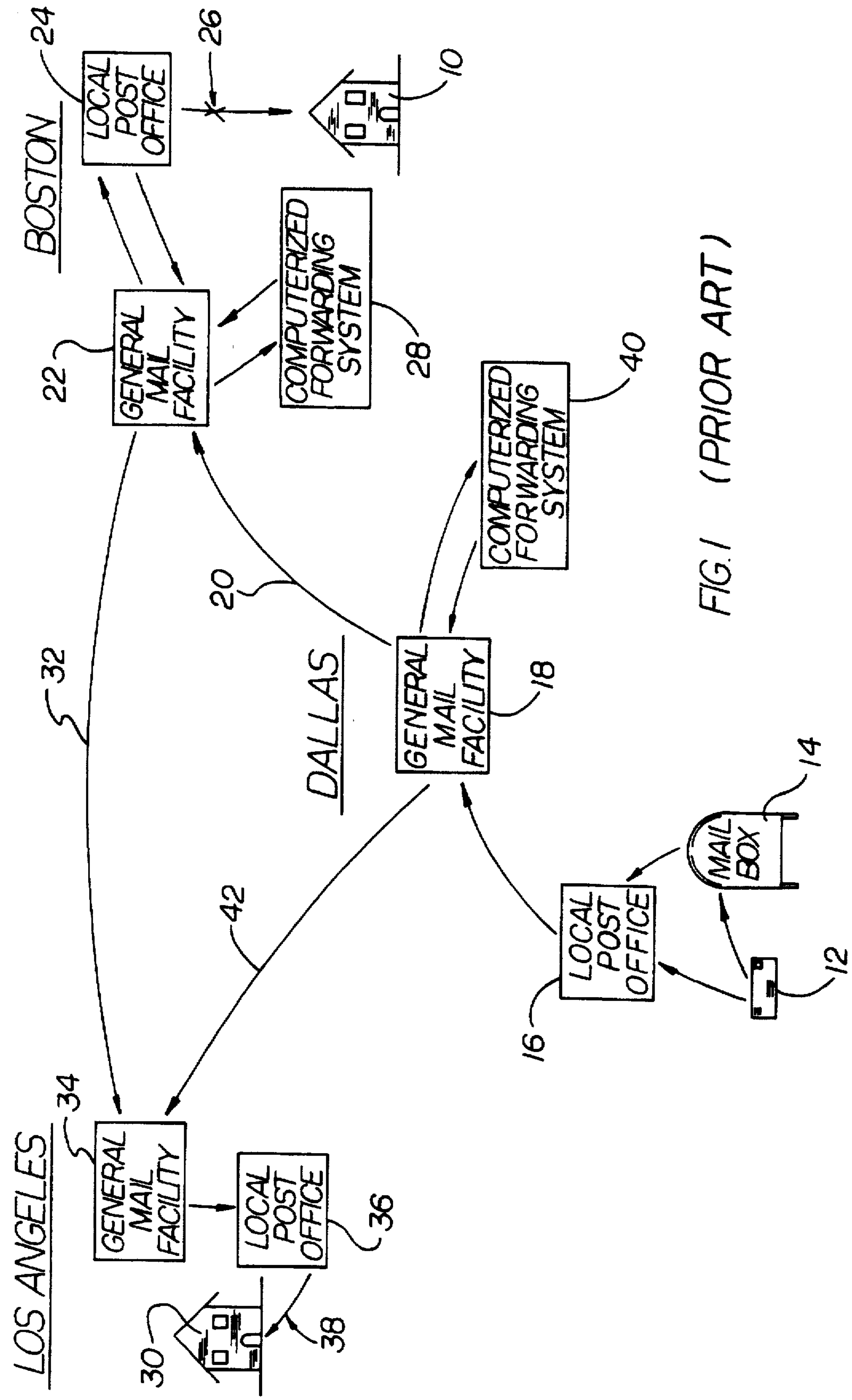
FIG. 1 (PRIOR ART)
FIG. 1 shows the current USPS practice of handling incorrectly addressed mailpieces.

Reference is now made to the Drawings, wherein identical reference numerals refer to like or similar parts and, in particular, to FIG. 1 of the Drawings wherein there is shown the current United States Postal Service (USPS) practice for processing, identifying, intercepting and forwarding of incorrectly addressed mailpieces. The cities referenced herein are used for illustrative purposes only. The process starts, for example, in Dallas when an addressor places an incorrect (no longer valid) destination address, for a location (delivery point) 10 in Boston, on a mailpiece 12. The addressor then deposits the mailpiece 12 in the mail stream at a mailbox 14 or at the local post office 16. Once at the post office 16, the deposited mailpiece 12 is delivered to the General Mail Facility (GMF) 18 for the Dallas area. The Dallas GMF 18 processes the mailpiece 12 through the conventional, well known USPS automated mail processing equipment to determine the delivery point ZIP code for the destination address on the mailpiece 12 at the delivery point 10. A corresponding destination (POSTNET) bar code for that delivery point ZIP code is then printed on the mailpiece. The Dallas GMF 18 equipment sorts the mailpiece 12 according to the affixed destination (POSTNET) code and delivers the mailpiece, as generally indicated at 20, to the GMF 22 for the Boston area.

Once in Boston, the mailpiece 12 is processed according to its destination (POSTNET) bar code through the sorting equipment at the Boston GMF 22 and delivered to the local post office (delivery point unit) 24 for the incorrect address at the delivery point 10. At the local post office 24, the mail carrier cases the mailpiece 12 according to the destination address for the delivery point 10 to facilitate delivery along each designated postal route 26. Eventually, the mail carrier will recognize that the address for the delivery point 10 on the mailpiece 12 is no longer valid (typically by means of a filed change of address form). The incorrectly addressed mailpiece 12 is then manually intercepted by the carrier from the postal stream and sent to a Computerized Forwarding System (CFS) 28 for the Boston area.

At the Boston area CFS 28, the incorrectly addressed mailpiece 12 is handled by a semi-automated process wherein an extract of the name of the addressee and incorrect address for the delivery point 10 is entered by an operator into a computer and processed in the USPS National Change of Address (NCOA) database (generated from all filed change of address forms). The computer will retrieve from the NCOA data base one or more possible choices of addressee name and former address that favorably compare with the operator input name and address at the delivery point 10 for the mailpiece. The operator will then select from the menu of choices provided by the computer, according to known USPS specified forwarding rules, the closest or exact match of names and addresses and obtain a forwarding address for the mailpiece 12 at a delivery point 30 in Los Angeles. The mailpiece 12 is then manually or mechanically a labeled with the forwarding address in Los Angeles. A destination (POSTNET) bar code corresponding to the delivery point ZIP code for the forwarding address is also printed on the mailpiece to facilitate transportation, as generally indicated at 32, across the country to the GMF 34 for the Los Angeles area, and delivery through the local post office (delivery point unit) 36 and along the designated postal route 38 to the forwarding address at the delivery point 30.

As illustrated by the example of FIG. 1, the current USPS forwarding mail identification system makes inefficient use of limited USPS time and money by delaying the identification, interception and rerouting (forwarding) of an incorrectly addressed mailpiece until after the mailpiece has reached the local post office for the incorrect destination address. It would be preferable if the identification of an incorrectly addressed mailpiece occurred at the local post office or GMF for the area where the mailpiece is first deposited into the mail stream by the addressor. For the scenario of FIG. 1, for example, if the identification of the incorrectly addressed mailpiece 12 occurred at the Dallas GMF 18, rather than at the local post office 24 in Boston, the local Dallas CFS 40 could be utilized to determine the forwarding address at location 30 and the mailpiece could be transported, as generally indicated at 42, directly to Los Angeles. This would eliminate the added time and cost expended in transporting the mailpiece 12 to and from Boston for delivery to an incorrect destination address. Furthermore, if the new forwarding address at location 30 could be determined at the Dallas GMF 18 (rather than at a CFS), the additional expense of CFS processing would be eliminated.

Figure 2:
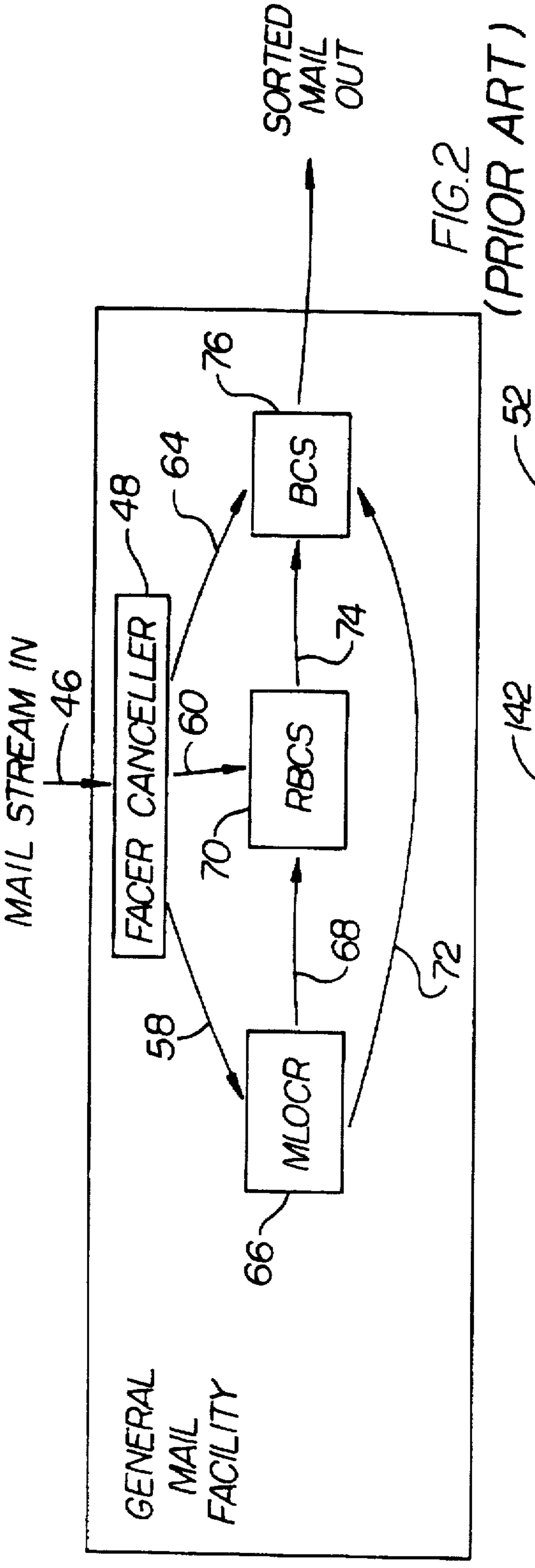
FIG.2 (PRIOR ART)
FIG. 2 illustrates the method of processing incoming mailpieces at a USPS General Mail Facility (GMF)

Referring now to FIG. 2, there is shown the processing method for incoming mailpieces at a USPS General Mail Facility (GMF). Each mailpiece 44 (FIG. 3) in the mail stream 46 is initially processed by a Facer Canceler (FC) 48 that orients the mailpieces according to the address side 50, applies a cancellation mark 52 over the stamp 54, and roughly segregates the mailpieces into three major categories: those having a machine readable destination address 56 (path 58); those having a non-machine readable destination address (path 60); and, those having a destination (POSTNET) bar code 62 (path 64). It will, of course, be understood that mailpieces 44 that have previously been properly oriented, cancelled and segregated, such as mail delivered from another GMF where these processes have already occurred, need not be processed by the FC 48.

Machine readable mailpieces are processed by an automated optical scanning system commonly referred to as a Multiline Optical Character Reader (MLOCR) 66. Non-machine readable mailpieces are received either directly from the FC 48 (path 60) or indirectly from the MLOCR 66 (path 68) and processed by a semi-automated optical imaging apparatus commonly referred to as a Remote Bar Coding System (RBCS) 70. The primary functions of both the MLOCR 66 and RBCS 70 are to read and identify the destination address 56 for the delivery point, determine the unique delivery point ZIP code (delivery point information) for the destination address and print the destination (POSTNET) bar code 62 corresponding to that ZIP code on the mailpiece 44. Destination (POSTNET) bar coded mailpieces, from the FC 48 (path 64), MLOCR 66 (path 72) and RBCS 70 (path 74), are then processed and sorted according to the destination (POSTNET) bar code 62 by a bar code sorter (BCS) 76.

As the FC 48, MLOCR 66, RBCS 70 and BCS 76 are common pieces of USPS automated mail processing equipment whose function, operation and design are well known in the art, detailed functional, operational and design description beyond that needed for an understanding of the present invention is deemed unnecessary. The present invention comprises enhancements in the USPS automated mail processing equipment described above that will add the capability of identifying mailpieces that require forwarding due to an incorrect destination address (known as forwarding mail identification—FMI). Furthermore, the enhancements of the present invention will also obtain and apply the correct forwarding address to an incorrectly addressed mailpiece (known as automated mail forwarding—AMF).

Figure 3:
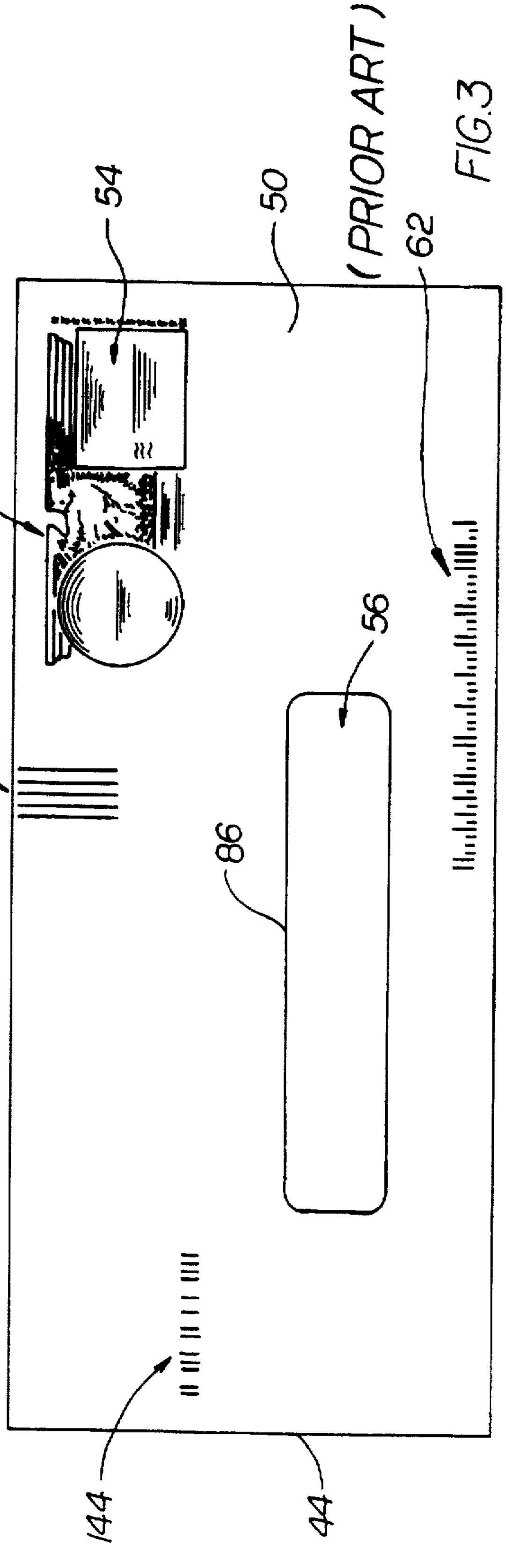
(PRIOR ART) FIG.3
FIG. 3 is an illustration of a typical mailpiece.
Figure 4:
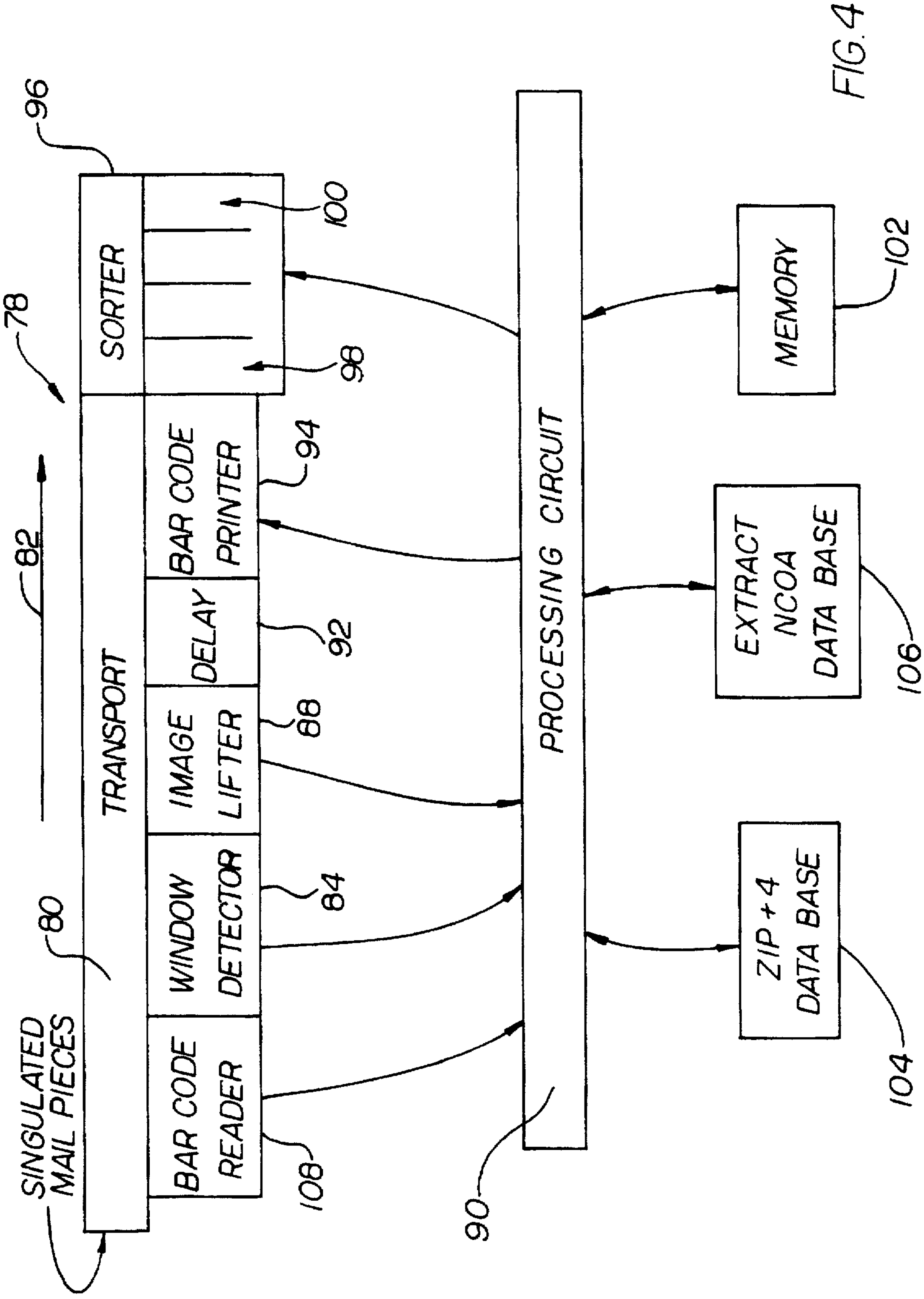
FIG. 4 is a schematic view of the automated forwarding mail identification system (FMI) of the present invention for machine readable mailpieces.

Referring now to FIG. 4, there is shown a schematic illustration of the automated forwarding mail identification system (FMI) 78 of the present invention for machine readable mailpieces. A singulated stream of machine readable mailpieces are fed down a mechanical transport 80 in the direction indicated by arrow 82. A window detector 84 scans each mailpiece to determine the presence of a reflective window 86 (FIG. 3) that identifies the location of the destination address 56 on the mailpiece. Each mailpiece is then scanned by a high resolution video image lifter 88 that digitizes an image of the address side of each mailpiece. While the digitized image is processed by a processing circuit 90 for identification of whether the mailpiece is in need of forwarding, the mailpiece is momentarily held in a mechanical delay 92. If the mailpiece is not identified by the processing circuit 90 as in need of forwarding, a printer 94 applies a destination (POSTNET) bar code on the mailpiece corresponding to the delivery point ZIP code for the destination address, and the mailpiece is directed by a sorter 96 into a designated mail pocket 98 according to the bar code. If the mailpiece is identified by the processing circuit 90 as in need of forwarding, the mailpiece is not coded and is directed by the sorter 96 into a designated forwarding mail pocket 100 and collected for forwarding processing in a manner to be described.

The forwarding mail identification decision is made by the processing circuit 90 while the mailpiece is held in the delay 92. The digitized image of the mailpiece is processed by the circuit 90 in conjunction with window 86 (FIG. 3) information, if any, obtained by the detector 84 to determine the location of the destination address on the mailpiece and the lines of alphanumeric characters therein. Each individual character in the lines of characters (character information) is processed for recognition of the address information to thereby decode and identify the destination address on the mailpiece. The destination address revealed by the decoded character information is processed by the circuit 90 in the USPS ZIP+4 database 104 to determine the delivery point ZIP code for the mailpiece. It will, of course, be understood that any other database including delivery points and corresponding delivery point ZIP codes (for example, the USA database) may be substituted for the ZIP+4 database. The delivery point information (comprised of the delivery point ZIP code and/or destination address) is then processed in an extract of the USPS National Change of Address (NCOA) database 106 (containing the name and former address of each addressee at each delivery point who has filed a change of address form with the USPS) to determine if a forwarding request has been logged against that delivery point. It will, of course, be understood that any other database including a list of addressee names, and former addresses (and forwarding addresses) may be substituted for the NCOA database. The circuit 90 then checks the delivery point information against the list of former addresses for that delivery point. If the addresses match, the character information for the digitized image of the mailpiece is accessed by the circuit 90 to decode the name of the addressee for comparison to the name of the person in the NCOA database 106 requesting forwarding of the mail. If the names match, the circuit 90 identifies the mailpiece as in need of forwarding, saves the character information for the digitized image at an address in the memory 102 for later access and directs the sorter 96 to send the mailpiece into the designated forwarding mail pocket 100 for collection and reprocessing in a manner to be described.

Often, mailpieces arrive at the FMI system 78 pre-bar coded with an identification number. A bar code reader 108 at the entrance to the system 78 scans each mailpiece at entry to detect and transmit the mailpiece identification number to the processing circuit 90 for storage in the memory 102. When the mailpiece is scanned and the image digitized bythe image lifter 88, the character information for the .digitized image is stored at an address in the memory 102 linked to the mailpiece identification number. If the mailpiece is identified by the system 78 as in need of forwarding (sorted into the designated forwarding mail pocket 100), the linked identification number and character information fort he digitized image are retained in memory 102 to be subsequently accessed in a manner to be described to facilitate determination of a forwarding address and mark-up of the mailpiece. If the system 78 does not identify the mailpiece as in need of forwarding, the image and character information are erased from memory and the printer 94 will apply the destination (POSTNET) bar code corresponding to the delivery point ZIP code for the destination address.

Alternatively, if the mailpiece is not pre-coded with an identification number, the processing circuit 90 will generate a mailpiece identification number for storage in the memory 102 when the mailpiece enters the system 78. When the mailpiece is scanned and the image digitized by the image lifter 88, the digitized image is stored at an address in the memory 102 linked to the identification number. If the mailpiece is identified by the system 78 as in need of forwarding, the printer 94 will print an invalid destination (POSTNET) bar code corresponding to the mailpiece identification number on the mailpiece. The linked identification number and character information will be retained in memory 102 to be subsequently accessed in a manner to be described to facilitate determination of a forwarding address and mark-up of the mailpiece. If the system 78 does not identify the mailpiece as in need of forwarding, the character information is erased from memory and the printer 94 will apply the destination (POSTNET) bar code corresponding to the delivery point ZIP code for the destination address.

Figure 5:
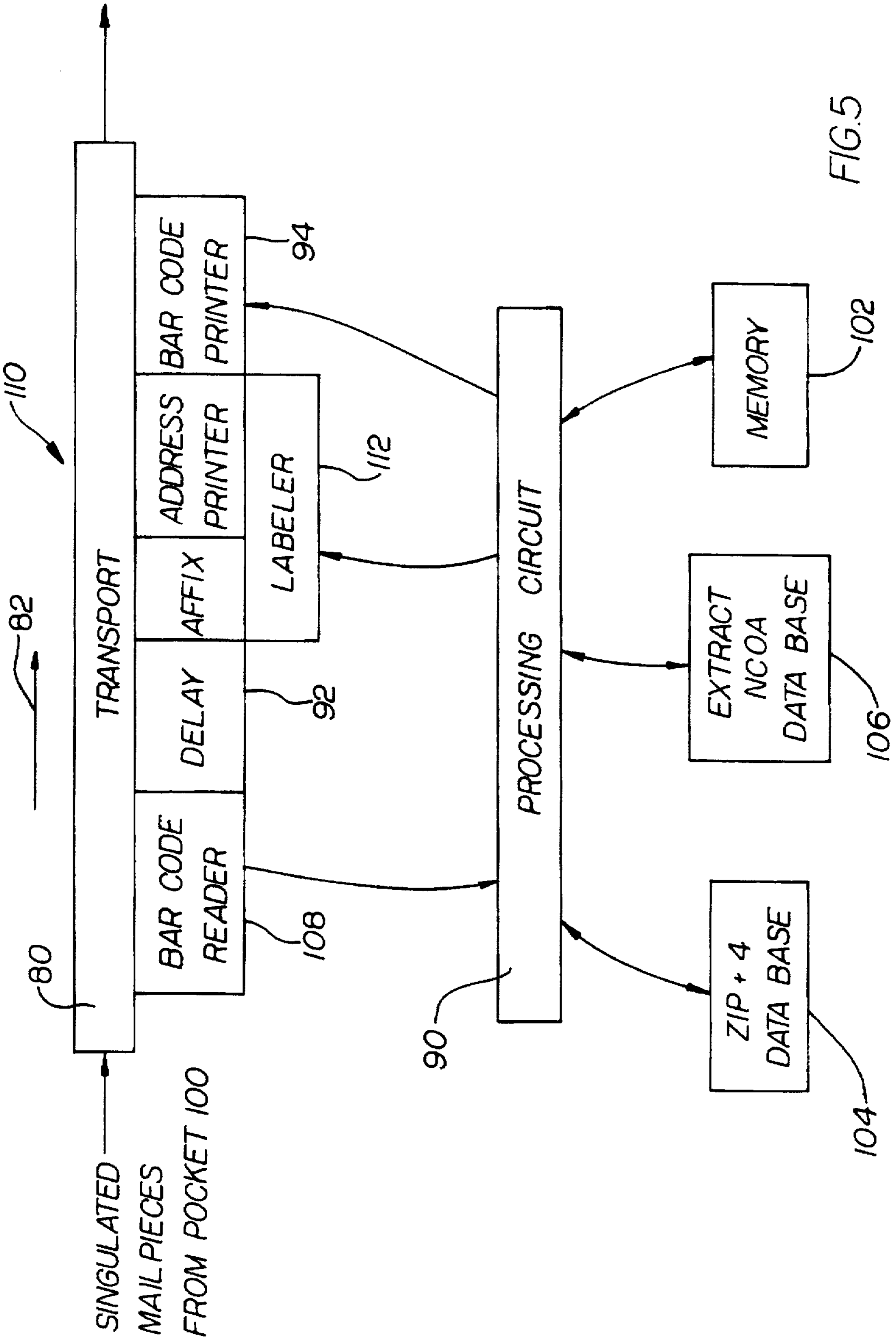
FIG. 5 is a schematic view of a separate stand-alone automated mailpiece mark-up unit.

Reference is now made to FIG. 5 wherein there is shown a stand-alone automated mailpiece mark-up unit 110 for processing incorrectly addressed mailpieces previously marked with a mailpiece identification number and identified as in need of forwarding. The singulated stream of incorrectly addressed mailpieces from pocket 100 are fed down a mechanical transport 80 in the direction indicated by arrow 82. A bar code reader 108 at the entrance to the system 110 detects and transmits the mailpiece identification number to the processing circuit 90 where the stored mailpiece character information, linked to the mailpiece identification number, is accessed from memory 102. While the character information is processed by the circuit 90 to determine a forwarding address, the mailpiece is momentarily held in a mechanical delay 92. If a forwarding address is obtained from the processing circuit 90, a labeler 112 affixes a USPS forwarding label to the mailpiece and prints the forwarding address thereon. A printer 94 also applies a destination (POSTNET) bar code on the mailpiece corresponding to the delivery point ZIP code for the forwarding address.

The processing circuit 90 obtains the forwarding address, while the mailpiece is held in the delay 92, by accessing the stored character information from the memory 102 and decoding the addressee name and destination address for the mailpiece. An extract of the USPS National Change of Address (NCOA) database 106 (containing the address name, former address and forwarding address of each addressee at each delivery point who has filed a change of address form with the USPS) is then searched according to the decoded delivery point information to determine a forwarding address for the mailpiece that will be transmitted to the labeler 112 along with the corresponding forwarding delivery point ZIP code.

Figure 6:
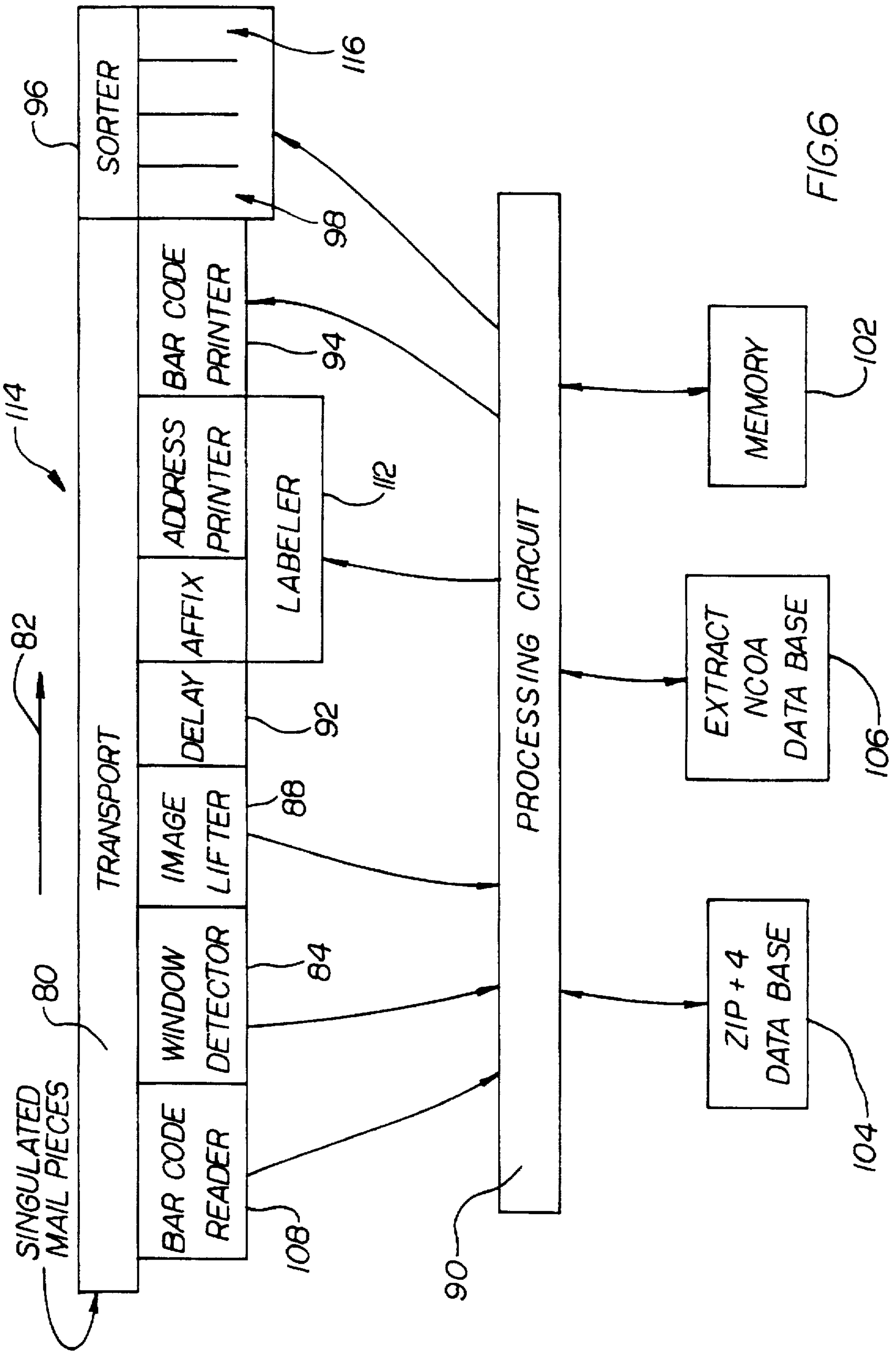
FIG. 6 is a schematic view of the automated mail forwarding system (AMF) of the present invention for machine readable mailpieces.

Referring now to FIG. 6, there is shown a combined FMI-AMF system 114 of the present invention for machine readable mailpieces that identifies mailpieces in need of forwarding and immediately obtains and applies a forwarding address. A singulated stream of machine readable mailpieces are fed down a mechanical transport 80 in the direction indicated by arrow 82. A window detector 84 scans each mailpiece to determine the presence of a reflective window 86 (FIG. 3) that identifies the location of the destination address 56 on the mailpiece. Each mailpiece is then scanned by a high resolution video image lifter 88 that digitizes an image of the address side of each mailpiece. While the digitized image is processed by a processing circuit 90 for identification of whether the mailpiece is in need of forwarding and determination of the forwarding address, the mailpiece is momentarily held in a mechanical delay 92. If the mailpiece is not identified by the processing circuit 90 as in need of forwarding, a printer 94 applies a destination (POSTNET) bar code on the mailpiece corresponding to the delivery point ZIP code for the destination address. If a forwarding address is obtained from the processing circuit 90, a labeler 112 affixes a USPS forwarding label on the mailpiece in place of the incorrect destination address and the forwarding address is printed thereon. A printer 94 also applies a destination (POSTNET) bar code on the mailpiece corresponding to the delivery point ZIP code for the forwarding address. Each mailpiece is then directed by a sorter 96 into a designated mail pocket 98 according to the destination bar code.

The identification and forwarding decisions for each mailpiece are made by the processing circuit 90 while the mailpiece is held in the delay 92. The digitized image of the mailpiece is processed by the circuit 90 in conjunction with window 86 (FIG. 3) information, if any, obtained by the detector 84 to determine the location of the destination address on the mailpiece and the lines of alphanumeric characters therein. Each individual character in the lines of characters (character information) is processed for recognition of address information to thereby decode and identify the destination address on the mailpiece. The destination address revealed by the decoded character information is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name, former address and forwarding address of each addressee at each delivery point who has filed a change of address form with the USPS) to determine if a forwarding request has been logged against that delivery point. The circuit 90 then checks the decoded destination address against the list of former addresses for that delivery point. If the addresses match, the character information for the digitized image of the mailpiece is accessed by the circuit 90 to decode the name of the addressee for comparison to the name of the person requesting forwarding of the mail. If the names match, the circuit 90 identifies the mailpiece as in need of forwarding, accesses the forwarding address for the mailpiece from the NCOA database 106 and transmits the forwarding address to the labeler 112 along with the delivery point ZIP code for the forwarding address.

In the event the processing circuit 90 is unable to decode the destination address for the mailpiece (if, for example, the mailpiece is non-machine readable or the processing circuit 90 cannot identify the delivery point ZIP code for the address), then the digitized image obtained by the image lifter 88 is stored at an address in the memory 102 linked to a mailpiece identification number that has been previously printed on the mailpiece. Non-machine readable mailpieces are directed by the sorter 96 into a designated mail pocket 116 and transferred, along with the linked identification numbers and digitized images from memory 102, for subsequent processing.

Figure 7:
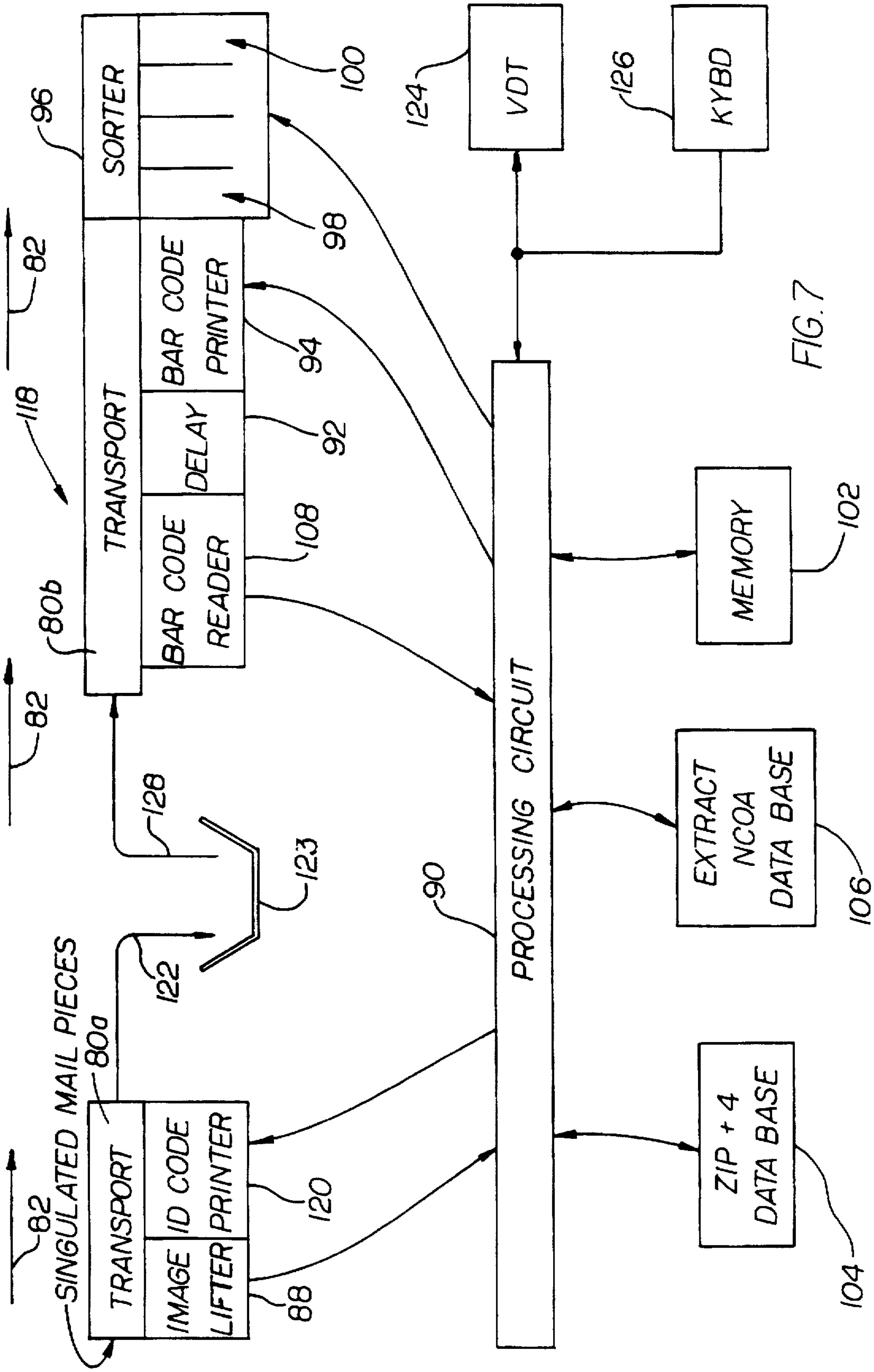
FIG. 7 is a schematic view of the semi-automated forwarding mail identification system (FMI) of the present invention for non-machine readable mailpieces.

Referring now to FIG. 7, there is shown a schematic illustration of the semi-automated forwarding mail identification system (FMI) 118 of the present invention for non-machine readable mailpieces. A singulated stream of non-machine readable mailpieces are fed down a first mechanical transport 80*a* in the direction indicated by arrow 82. Each mailpiece is then scanned by a high resolution video image lifter 88 that digitizes an image of the address side of each mailpiece. As each mailpiece enters the system 118, a processing circuit 90 generates a mailpiece identification number that is applied to the mailpiece by an ID bar code printer 120. The image of the mailpiece that is scanned and digitized by the image lifter 88 is stored in the memory 102 at an address linked to the mailpiece identification number. The transport 80*a* outputs the imaged and ID coded mailpieces, as generally indicated with arrow 122, for temporary storage in a bin 123 while the mailpieces are processed in the manner to be described to identify each mailpiece in need of forwarding.

Because the addresses on these mailpieces cannot be read by a machine, the stored digitized images are processed by one or more human operators who view the digitized images of each mailpiece utilizing a video display terminal (VDT) 124. Each operator accesses a digitized image from the memory 102 using the processing circuit 90. The image is viewed and the operator enters, via a keyboard 126, an extract of the destination address into the processing circuit 90. The destination address is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name and former address of each addressee at each delivery point who has filed a change of address form with the USPS) to determine if a forwarding request has been logged against that delivery point. If yes, the operator is prompted by the processing circuit 90 through the VDT 124 with at least one name of a person filing a forwarding request on that delivery point. If the name and address obtained from the NCOA database 106 and the name and address of the imaged mailpiece displayed on the VDT 124 match, the mailpiece is identified as in need of forwarding and an operator enters a forwarding mail notation that is linked with the mailpiece identification number and stored in the memory 102.

After the digitized images of the mailpieces have been manually processed by the operators, the singulated stream of mailpieces is retrieved from the bin 123, as generally indicated with arrow 128, in any desired order and fed down a second mechanical transport 80*b* in the direction indicated by arrow 82. A bar code scanner 108 at the entrance to the second transport 82*b* detects and transmits to the processing circuit 90 the mailpiece identification number previously applied to each mailpiece. While the identification number is processed by the processing circuit 90 to identify whether the mailpiece is in need of forwarding, the mailpiece is momentarily held in a mechanical delay 92. Using the mailpiece identification number, the processing circuit 90 accesses memory 102 to determine if the operator has entered a forwarding mail notation for the mailpiece. If the mailpiece is not to be forwarded, a printer 94 applies a destination (POSTNET) bar code corresponding to the delivery point ZIP code obtained from the ZIP+4 database 104 for the destination address and the mailpiece is directed by a sorter 96 into a designated mail pocket 98. If the mailpiece is noted for forwarding, the circuit 90 saves the forwarding notation and the forwarding information for the mailpiece in memory 102 at an address linked to the mailpiece identification number for later access and directs the sorter 96 to send the mailpiece into a designated forwarding mail pocket 100 for collection and further processing to obtain the forwarding address and mark-up the mailpiece.

Figure 8:
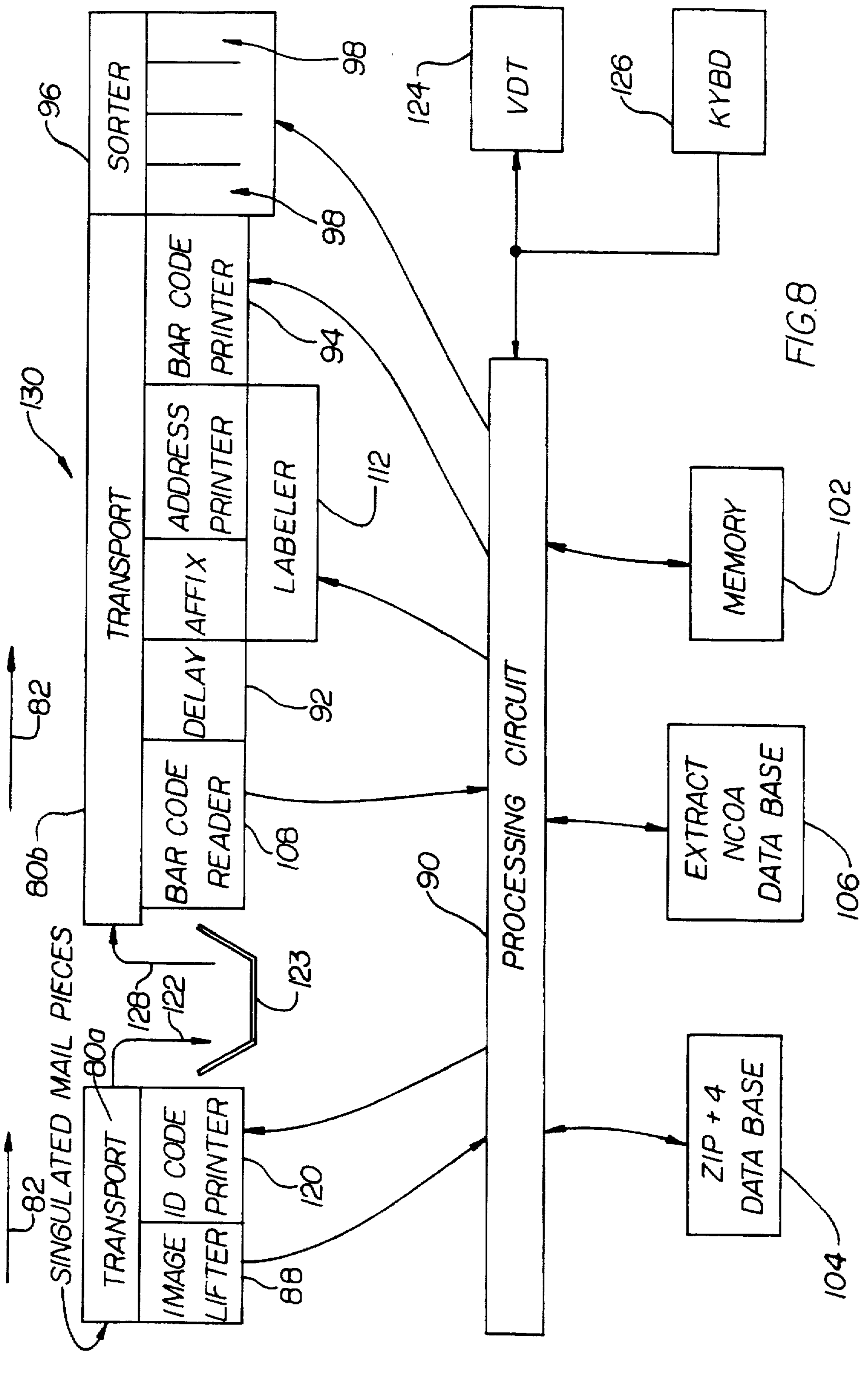
FIG. 8 is a schematic view of the semi-automated mail forwarding system (AMF) of the present invention for non-machine readable mailpieces.

Referring now to FIG. 8, there is shown a combined FMI-AMF system 130 of the present invention for non-machine readable mailpieces that identifies mailpieces in need of forwarding and immediately applies a forwarding address. A singulated stream of non-machine readable mailpieces are fed down a first mechanical transport 80*a* in the direction indicated by arrow 82. Each mailpiece is then scanned by a high resolution video image lifter 88 that digitizes an image of the address side of each mailpiece. As each mailpiece enters the system 130, a processing circuit 90 generates a mailpiece identification number that is applied to the mailpiece by an ID bar code printer 120. The image of the mailpiece that is scanned and digitized by the image lifter 88 is linked to the mailpiece identification number and stored in the memory 102. The transport 80*a* outputs the imaged and ID coded mailpieces, as generally indicated with arrow 122, for temporary storage in a bin 123 while the mailpieces are processed in the manner to be described to identify those mailpieces in need of forwarding and determine the forwarding address.

Because the addresses on these mailpieces cannot be read by a machine, the stored digitized images are processed by one or more human operators who view the digitized images of each mailpiece utilizing a video display terminal (VDT) 124. Each operator accesses a digitized image from the memory 102 using the processing circuit 90. The image is viewed and the operator enters, via a keyboard 126, an extract of the destination address into the processing circuit 90. The destination address is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name, former address and forwarding address of each addressee at each delivery point who has filed a change of address form with the USPS) to determine if a forwarding request has been logged against that delivery point. If yes, an operator is prompted by the processing circuit 90 through the VDT 124 with at least one name of a person filing a forwarding request on that delivery point. If the name and address obtained from the NCOA database 106 and the name and address of the imaged mailpiece displayed on the VDT 124 match, the mailpiece is identified as in need of forwarding and the operator enters a forwarding mail notation that is stored in the memory 102 at an address linked with the identification number for the mailpiece. The processing circuit 90 then accesses the NCOA database 106 and retrieves a forwarding address for the mailpiece that is linked to the mailpiece identification number and stored in memory 102.

After the digitized images of the mailpieces have been manually processed by the operators, the singulated stream of mailpieces is retrieved from the bin 123, as generally indicated with arrow 128, in any desired order and fed down a second mechanical transport **80*b* in the direction indicated by arrow 82. A bar code scanner 108 at the entrance to the second transport 82*b* detects and transmits to the processing circuit 90 the mailpiece identification number previously applied to each mailpiece. While the identification number is processed by the processing circuit 90 to identify whether the mailpiece is in need of forwarding, the mailpiece is momentarily held in a mechanical delay 92. Using the mailpiece identification number, the processing circuit 90 accesses memory 102 to determine if the operator has entered a forwarding mail notation. If the mailpiece is not to be forwarded, a printer 94 applies a destination (POSTNET) bar code on the mailpiece corresponding to the delivery point ZIP code obtained from the ZIP database 104 for the destination address. If the mailpiece is noted for forwarding, the circuit 90 retrieves the stored forwarding address linked to the mailpiece identification number in memory 102 and a labeler 112 affixes a USPS forwarding label on the mailpiece in place of the incorrect destination address and the forwarding address is printed thereon. A printer 94 also applies a destination (POSTNET) bar code on the mailpiece corresponding to the delivery point ZIP code, for the forwarding address. Each mailpiece is then directed by a sorter 96 into a designated mail pocket 98** according to the destination bar code.

Figure 9:
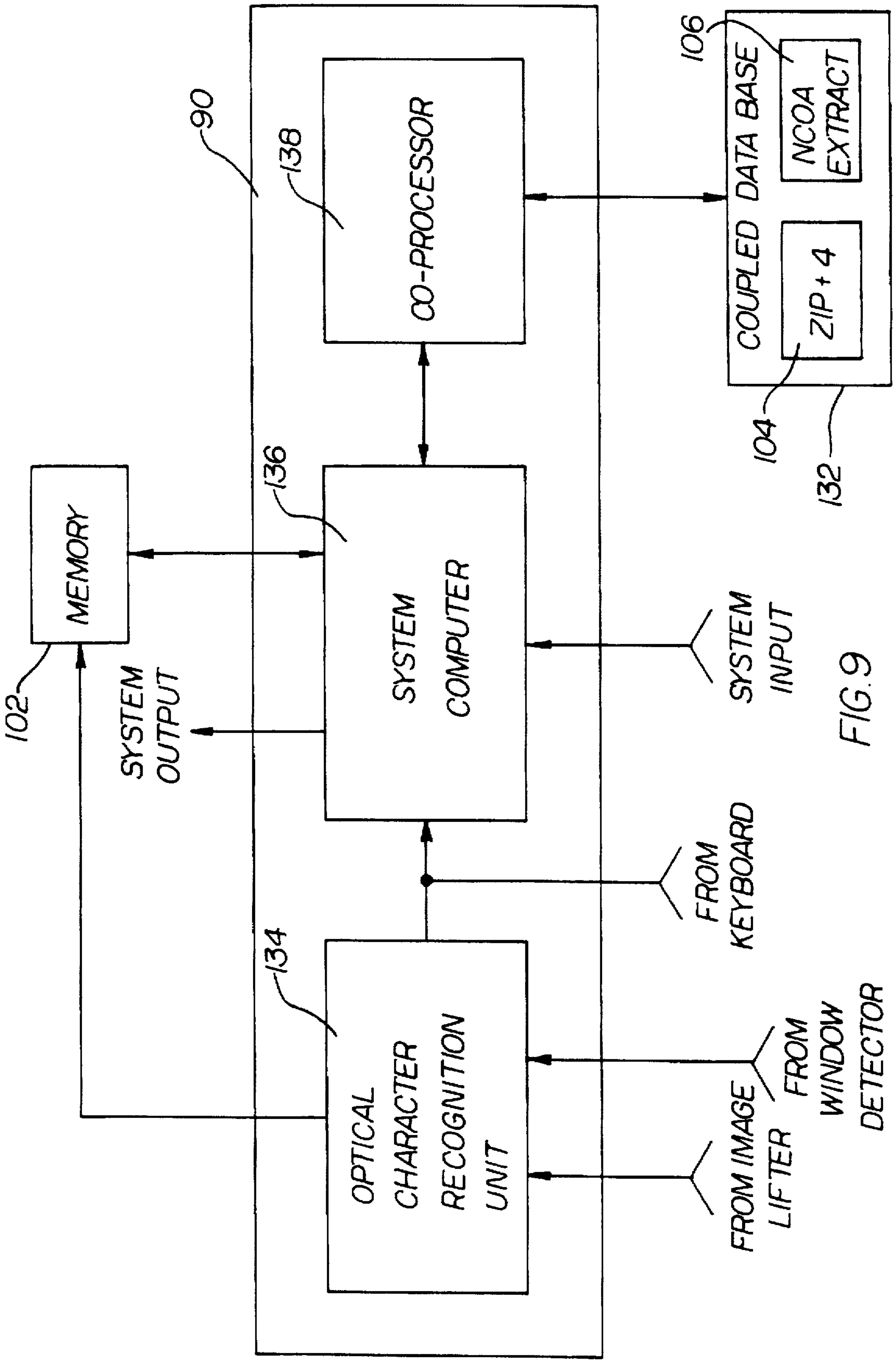
FIG. 9 is a schematic view of a first embodiment of the processing circuit with coupled ZIP+4 and NCOA databases.

Referring now to FIG. 9, there is shown a schematic view of a first embodiment of the processing circuit 90 wherein the ZIP+4 and NCOA databases, 104 and 106, respectively, are coupled in a single memory area 132. The processing unit 90 comprises an optical character recognition unit 134, a system computer 136 and a co-processor 138. It will, of course, be understood that a co-processor 138 need not be included if the system computer operates at a sufficiently fast rate to perform all required tasks. The optical character recognition unit 134 receives the digitized image of each mailpiece from the image lifter 88 (FIGS. 4 and 6) and processes the image to locate each line of the destination address and each character within each line (character information). The optical character recognition unit further processes each character for recognition and outputs the destination address in a data format that is understood by the system computer 136.

For non-machine readable mail in the FMI and/or AMF system embodiments of FIGS. 7 and 8, the character information for the destination address is input by the operator to the system computer 136 from a keyboard 126 as a result of the entry by an operator viewing the digitized image of the mailpiece. In such case, the images are transferred into memory 102 via a LAN or other communication means from a separate memory 102 associated with the lifting of the images from the mail stream. Alternatively, the images are input directly from an image lifter via the system computer 136.

The system computer 136 transmits the character information to the co-processor 138 where the information is decoded to identify the destination address for the mailpiece. The co-processor 138, according to the destination address, accesses the ZIP+4 portion of the coupled database 132 to obtain the corresponding delivery point ZIP code. In the coupled database 132, if a mail forwarding request has been logged against a destination address, the delivery point information (comprised of the delivery point ZIP code and/or destination address) will be flagged notifying the co-processor to decode the character information to identify the name of the destination addressee. The co-processor 138 will then compare the decoded addressee name and destination address with the name and former address of the person who has requested mail forwarding at that delivery point. If the names and addresses match, the co-processor 138 signals the system computer 136 that the mailpiece has been identified as in need of forwarding. The mailpiece will then be intercepted from the mail stream by the sorter 96. If either the delivery point information has not been flagged, the names and addresses do not match or specified USPS forwarding criteria has not been met, then the co-processor 138 will send the system computer 136 the delivery point ZIP code for the decoded destination address for printing on the mailpiece by the printer 94 or the mailpiece will be sent for further processing according to USPS forwarding rules. The coupled database 132 may be expanded to further include the forwarding address for each forwarding request in which case the co-processor 138 will access the coupled database 132 and send back to the system computer 136 the forwarding address and the delivery point ZIP code for the forwarding address.

Figure 10:
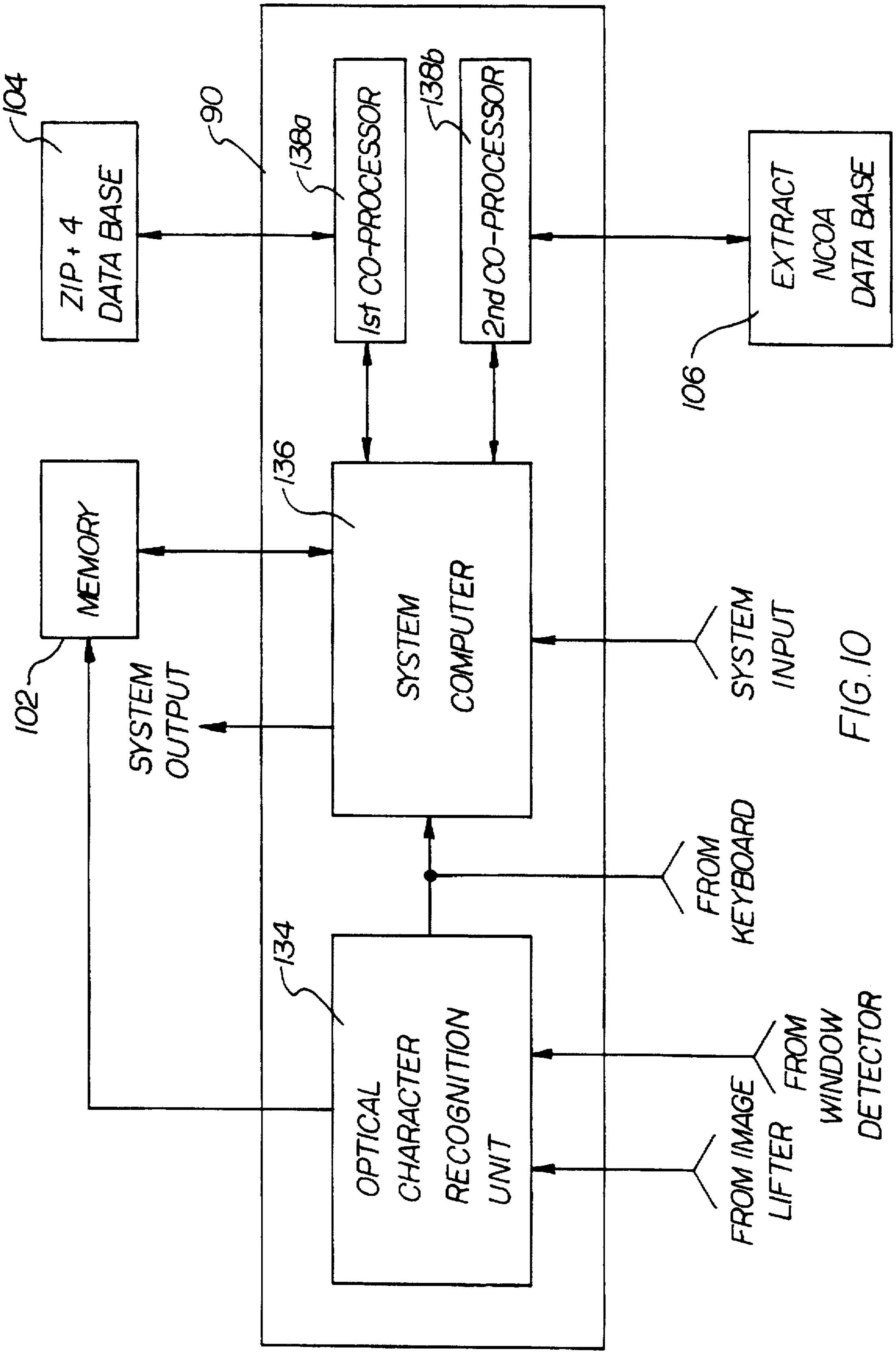
FIG. 10 is a schematic view of a second embodiment of the processing circuit with separately accessed ZIP+4 and NCOA databases.

Referring now to FIG. 10, there is shown a schematic view of a second embodiment of the processing circuit 90 wherein the ZIP+4 and NCOA databases, 104 and 106, respectively, are separately accessed. The processing unit 90 comprises an optical character recognition unit 134, a system computer 136 and separate co-processors **138*a* and 138*b* linked to the ZIP+4 and NCOA databases, 104 and 106, respectively. It will, of course, be understood that the use of a separate co-processor 138 will not be necessary in the event the system computer 136 operates at a sufficiently fast rate to perform all required tasks. The optical character recognition unit 134 receives the digitized image of each mailpiece from the image lifter 88 (FIGS. 4 and 6) and processes the image to locate each line of the destination address and each character within each line (character information). The optical character recognition unit further processes each character for recognition and outputs the destination address in a data format that is understood by the system computer 136**.

For non-machine readable mail in the FMI and/or AMF system embodiments of FIGS. 7 and 8, the destination address is input by the operator to the system computer 136 from a keyboard 126 as a result of the entry by an operator viewing the digitized image of the mailpiece. In such case, the images are transferred into memory 102 via a LAN or other communication means from a separate memory 102 associated with the lifting of the images from the mail stream. Alternatively, the images are input directly from an image lifter via the system computer 136.

The system computer 136 transmits the character information to the first co-processor **138*a* where the character information is decoded to identify the destination address for the mailpiece. The first processor 138*a*, according to the decoded destination address, accesses the ZIP+4 database 104 to obtain and return to the system computer 136 the corresponding delivery point ZIP code. The system computer 136 transmits the delivery point information to the second co-processor 138*b*. The second co-processor 138*b*, according to the delivery point information, accesses the NCOA database 106 to determine whether a mail forwarding request has been logged against that delivery point. If yes, the second co-processor 138*b*** will use the character information to identify the name of the destination addressee for comparison with the name and address of the person who has requested mail forwarding at that delivery point. If the names and addresses match, the second co-processor 138*b* signals the system computer 136 that the mailpiece has been identified as in need of forwarding. The mailpiece will then be intercepted from the mail stream by the sorter 96. If no mail forwarding request has been logged against the delivery point, the names and addresses do not match or the USPS forwarding criteria has not been met, the second co-processor 138*b* will signal the system computer to print the destination (POSTNET) code corresponding to the delivery point ZIP code on the mailpiece or send the mailpiece for further processing according to USPS forwarding rules. The NCOA database 106 may be expanded to further include the forwarding address for each addressee requesting mail forwarding in which case the second co-processor 138*b* will access the NCOA database 106 and send back the forwarding address and the delivery point ZIP code corresponding to the forwarding address.

With either of the processing circuit 90 and database arrangements illustrated in FIGS. 9 and 10, the system computer 136 further functions to control the operation of each system (FIGS. 4–8) and the processing of each mailpiece. For example, the system computer 136, via the system input, will receive information from the bar code reader 108 to obtain the identification number for each mailpiece and control the operation of the transport 80 and sorter 96, via the system output, to move the mailpieces through the system and into the proper mail pocket. Furthermore, in response to the signals of the co-processor(s) 138, the system computer 136, via the system output, will cause the bar code printer 94 and ID code printer 120 to print identification code or POSTNET codes as required on the mailpieces and direct the printing of the forwarding address by the labeler 112. The system computer 136 also controls the storage of linked digitized mailpiece images, mailpiece data, mailpiece identification numbers and mailpiece forwarding information in the memory 102.

As is well known, often times an addressor of a mailpiece does not wish for an incorrectly addressed mailpiece to be forwarded to the correct destination. Thus, an endorsement such as "DO NOT FORWARD" is placed on the mailpiece. Other times, the addressor wants the mailpiece be forwarded to the addressee. Thus, an endorsement such as "ADDRESS CORRECTION REQUESTED" is placed on the mailpiece. Furthermore, under USPS mail processing rules, certain types and classes of mailpieces are not to be forwarded unless meeting certain known USPS criteria. If mailpieces are to be efficiently handled for forwarding, the automated equipment must be able to distinguish between those mailpieces that are to be forwarded and those that are not to be forwarded.

Figure 11:
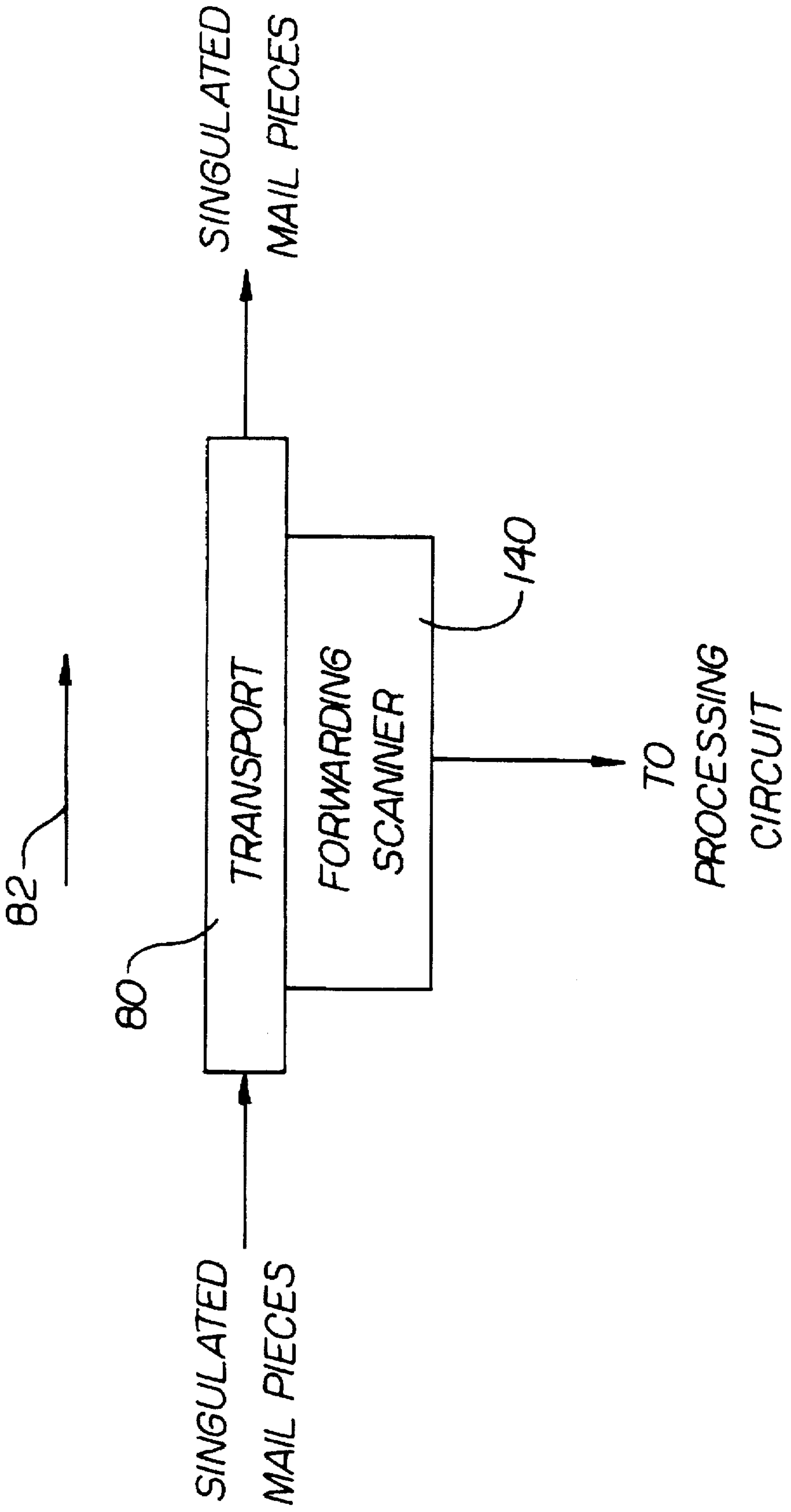
FIG. 11 is a schematic view of a scanner for mechanically identifying forwarding endorsements and requirements placed on mailpieces.

For non-machine readable mailpieces processed by the FMI and AMF systems of FIGS. 7 and 8, machine recognition of forwarding requests and requirements is not necessary because each mailpiece is viewed by human operator who may identify the mailpiece type and forwarding endorsements displayed on the VDT 124 and process, via the keyboard 126, each mailpiece as required or requested. In the FMI and/or AMP systems of FIGS. 4 and 6 for machine readable mailpieces, however, there must exist a means for categorizing the mailpieces according to the forwarding requirements and requests and a means for scanning the mailpieces during processing to identify mailpiece forwarding requirements and requests. Reference is now made to FIG. 3, wherein there is shown a typical mailpiece 44, and FIG. 11, wherein there is shown a scanner 140 mounted to the transport 80 for incorporation into any of the FMI and AMF systems illustrated in FIGS. 4–8 to scan each mailpiece in the mail stream for machine readable forwarding request and requirement markings. It will, of course, be understood that the operations performed by the scanner 140 may be performed by the image lifter 88 or bar code scanner 108.

The existing type of facing identification marks (FIM) 142 on the mailpiece may be used to code the forwarding requests of the addressor or requirements of the USPS. Another option is to place a bar code (of any known type) 144 on the mailpiece, perhaps near the return address, that designates the forwarding request or requirements for the mailpiece. Another option is to optically read mail class identification, forwarding endorsements and return address information. In any case, the scanner 140 will detect and decode the forwarding requests or requirements from the information printed on the mailpiece and transmit the forwarding information to the processing circuit 90 to control the handling of the mailpiece for sorting into a designated mail pocket. If the mailpiece is coded "DO NOT FORWARD", for example, the circuit 90 will direct the mailpiece to be sorted into a special designated pocket. For an addressor who requests to be informed of a new (forwarding) address for an addressee (according to the information detected by the scanner 140), the image lifter 88 used by the system described in FIGS. 4–8 will capture and digitize an image of the mailpiece for storage in memory for each identified instance of mailpiece forwarding. If an addressor has requested to be informed of the forwarding of incorrectly addressed mailpieces, the digitized images of each forwarded mailpiece will be accessed from memory 102 and off-line printed. The forwarded mailpiece printouts for each addressor are then collected and sent by the USPS to the addressor to provide notification of both the forwarding of the mailpiece and the new forwarding address for the addressee.

The FMI and/or AMF systems of FIGS. 4–8 also provide a means for automatically updating the USPS NCOA database. The information on the USPS Change of Address Order Form (Form 3575), for example, may be scanned by the image lifter 88 and either decoded by specialized forms reading circuits within the processing circuit 90 or viewed and input by an operator through the VDT 124 and keyboard 126. The data from the change of address form may then be processed by the circuit 90 to access and update the NCOA database 106 if the data has not already been entered into the database.

The FMI and/or AMF systems of the present invention may further be integrated with existing USPS automated mail processing equipment with minimal effort. For example, the image lifter 88 and ID code printer 120 of FIGS. 7 and 8 are already present in the current USPS Multiline Optical Character Reader 66 (FIG. 2). USPS Multiline Optical Character Readers 66 decode digitized video images of mailpieces and search the ZIP+4 database to obtain the delivery point ZIP code and print the corresponding destination (POSTNET) bar code in a manner identical to that of the FMI and/or AMF systems of the present invention. Furthermore, the VDT 124 and keyboard 126 for processing digitized images of mailpieces are presently in the USPS Remote Bar Code System 70. Additional component integration opportunities are currently available or may be designed into future system upgrades for the USPS automated equipment.

Although several preferred embodiments of the FMI and/or AMF systems of the present invention have been described in the foregoing Detailed Description and illustrated in the accompanying Drawings, it will be understood that the invention is not limited to the embodiments disclosed, but is capable of numerous rearrangements, substitutions and modifications without departing from the spirit of the invention.

What is claimed is:

1. A mailpiece processing system for updating a change of address information list, comprising:

a line scanner for scanning a forwarding information form having address information including a former address, a forwarding address and an addressee name to capture forwarding information data in a computer memory representing address information for forwarding a mailpiece to a forwarding address, including the former address, the forwarding address and the addressee name;

a memory for storing a national change of address data base or an extract thereof containing address information including the former address, forwarding address and an addressee name for mailpieces to be forwarded to a forwarding address;

a comparator for comparing each of the items of address information for the captured forwarding information data from the forwarding information form with each of the items of address information of the national change of address information data base or an extract thereof to identify the absence of an item of address information of the forwarding information for the addressee captured from the forwarding information form and generating a forwarding signal when the presence of an item of address information of the forwarding information for the addressee cannot be identified on the national change of address data base or an extract thereof; and a processing circuit responsive to the forwarding signal for adding the address information of the forwarding information for the addressee to the national change of address database or an extract thereof.

2. The mailpiece processing system as in claim 1 wherein the comparator for comparing the captured data comprises means for comparing the identified former address and addressee name to a plurality of former addresses and addressee names maintained in the change of address database.

3. The mailpiece processing system as in claim 1 wherein the processing circuit responsive to the forwarding signal for adding comprises means for adding the identified former address, forwarding address and addressee name in the national change of address database.

4. The mailpiece processing system as in claim 1 wherein the line scanner comprises an image lifter.

5. The mailpiece processing system as in claim 4 wherein the line scanner further comprises a form reading circuit.

* * * * *